Patented Dec. 16, 1941

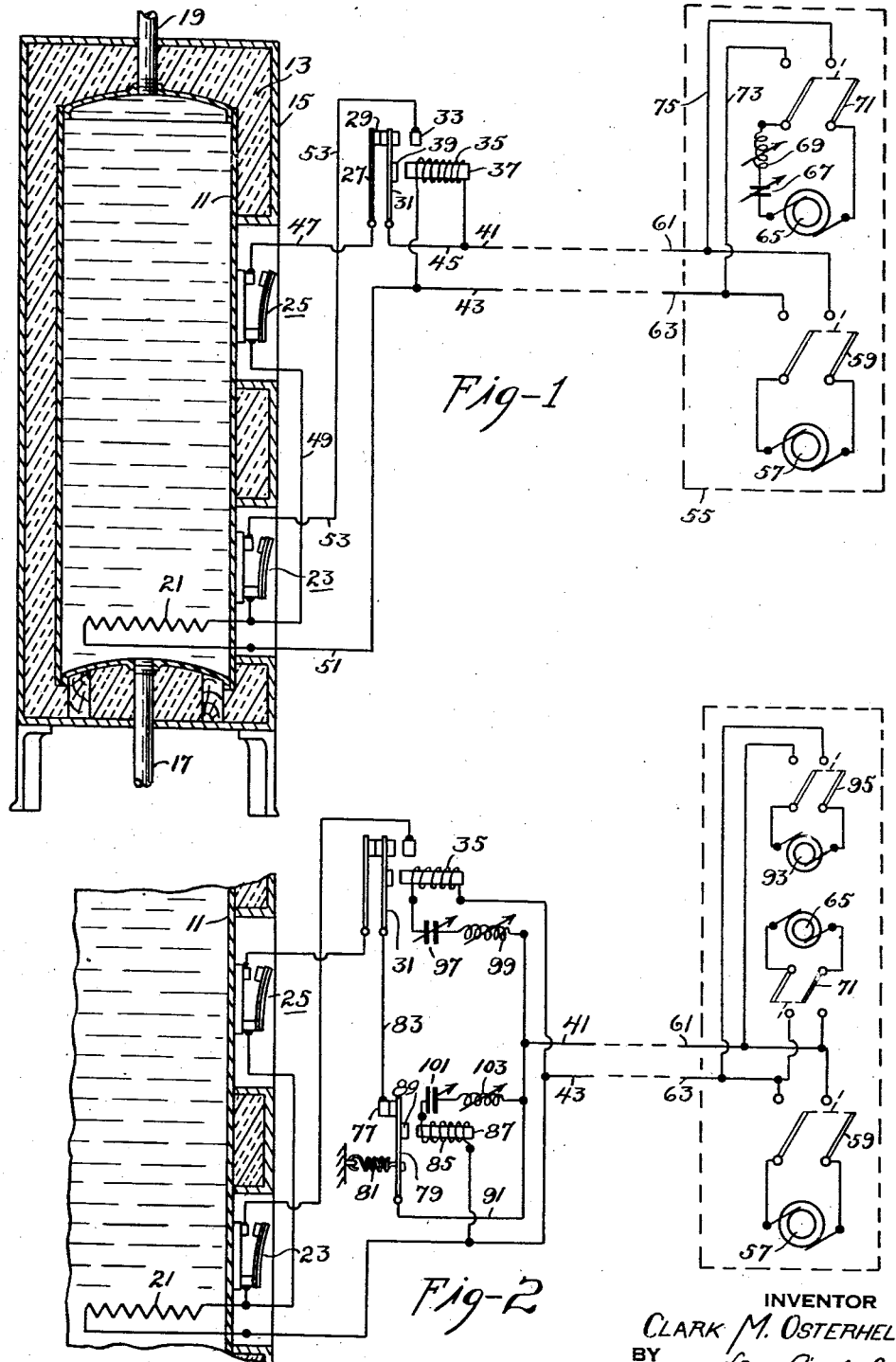

2,266,250

UNITED STATES PATENT OFFICE 2,266,250

WATER HEATING SYSTEM

Clark M. Osterheld, Stoughton, Wis., assignor to McGraw Electric Company, Elgin, Ill., a corporation of Delaware Application November 16, 1940, Serial No. 365,920

3 Claims. (Cl. 219—39)

My invention relates to electric water heating systems and particularly to continuously operative systems for such purpose.

An object of my invention is to provide a relatively simple system comprising a minimum number of control elements effective to maintain in a heated condition a part of the water content of a tank during one part of a day and to heat substantially all of the water in the tank during another part of the day.

Another object of my invention is to provide a water heating system effective to maintain different amounts of water in a tank in a heated condition during different parts of a day, controllable by remotely located relatively simple means.

Other objects of my invention will either be apparent from a description of several modifications embodying my invention or will be pointed out hereinafter in the course of such description and will be set forth in the appended claims.

In the drawing,

Figure 1 is a diagrammatic representation of my improved water heating system as applied to an ordinary domestic hot water tank, and, Fig. 2 is a view similar to Fig. 1 but showing a modified system embodying my invention.

Referring first to Fig. 1 of the drawing, I have there illustrated an ordinary hot water tank 11 illustrated as being of elongated cylindrical shape, such as used in ordinary household installations. The tank may be surrounded by a mass 13 of heat insulating material which may be held in place and protected by an outer casing 15. The tank is provided with a cold water inlet pipe 17 connected therewith at the bottom and with a hot water outlet pipe 19 connected therewith at the top of the tank. It is to be understood that while I am illustrating particular details of construction of a tank and its covering, I do not desire to be limited thereto since any equivalent structure now known in the art may be used by me.

I provide a single electric heater 21 which may be of the kind disclosed and claimed by me in my Patent No. 2,226,526 issued December 24, 1940. Since the heater itself forms no part of my present invention, it is illustrated generally only but I may point out that I prefer to locate the heater near the bottom end portion of the tank.

I provide further a main thermally actuable switch 23 here shown as a simple bimetallic element which is subject to the temperature of the water in the tank near the bottom end portion of the tank. The positions of the heater and of the main thermostatic switch 23 controlling the heater are such that the contacts of switch 23 will be in engagement with each other as long as the thermal switch is subject to cold water, but that the contacts will be disengaged from each other when substantially all of the water in the tank is hot.

I provide further an auxiliary thermal heater control switch 25 here shown generally only as including a flexible bimetallic element of the kind now well known in the art. This auxiliary thermal heater control switch is adapted to be mounted at a convenient or desired point along the height of the tank and it is, of course, obvious that the amount of water which must be hot in order to cause opening of any circuit controlled by the thermal switch 25 will vary in accordance with and be proportional to the position of this auxiliary thermal switch. The amount of water which corresponds to the auxiliary switch 25 is comprehended in the phrase used hereinafter that "a predetermined fractional part of the water content of the tank is hot or is cold."

I provide further a switching means including a two-operative-position switch here shown generally only as including a relatively rigid contact arm 27 or a fixed contact member 29, a resilient contact arm 31 normally yieldingly biased into engagement with the contact 29 or the contact arm 27, as well as a substantially fixed contact member 33 which is normally out of engagement with the contact arm 31 when the latter is actuated by either its own bias or by a suitable biasing means, into engagement with the contact 29.

The switching means includes further a stationary electromagnetic coil 35 and a magnetizable core member 37 fixed therein which latter is adapted to energize a suitable armature 39 mounted on the contact arm 31, to thereby counteract or overcome the bias of contact arm 31 above described and cause movement of the contact arm in a direction to cause it to engage fixed contact member 33.

A pair of supply circuit conductors 41 and 43 are provided and it is to be understood that these conductors are energized continuously. Supply circuit conductor 41 is connected by a conductor 45 to contact arm 31. Contact arm 27 or its equivalent contact 29 are connected by a conductor 47 to the fixed contact of the upper thermal switch 25. The other terminal of switch 25 is connected by a conductor 49 to one terminal of heater 21, the other terminal of which is connected by a conductor 51 to the other supply circuit conductor 43. Contact member 33 is connected by a conductor 53 to one of the terminals of the main thermal switch 23, the other terminal of which is connected to conductor 49 and therefore to one terminal of the heater 21.

I have illustrated a central station or electric power supply by the rectangular figure 55 which has operating therein an alternating current generator 57 which is to be understood as being of the ordinary standard frequency type. I have illustrated further a control switch 59 to indicate that the current provided by the generator 57 may be conducted into a set of bus bars or a network comprising conductors 61 and 63. Conductor 61 is to be understood as being connected through suitable circuits with supply circuit conductor 41 while conductor 63 is to be understood as being electrically connected with the other supply circuit conductor 43.

It is to be understood that the operation of the generator 57, or of its equivalent, is continuous so that supply circuit conductors 41 and 43 will be energized at all times. Under these conditions as to energization of the supply circuit, current flow will be established through the heater 21 and through the auxiliary heater control switch 25 as long as the amount of hot water in the tank is less than sufficient to affect and open the auxiliary thermal switch 25. The path of this current is as follows: From conductor 41 through conductor 45 to and through the engaged contact arms 31 and 27, through conductor 47 to and through the auxiliary switch 25 (which will be in closed position), through conductor 49 and from there through heater 21 and conductor 51 to the other supply circuit conductor 43. In ordinary domestic installations, withdrawals of hot water occur at odd times during the day, as hot water is needed, and as long as the amount of hot water in the tank is less than sufficient to affect the auxiliary thermal switch 25, this current flow will continue. However, if the effect of the heater 21 when so energized is to increase the amount of hot water in the tank to such an extent that the auxiliary heater control switch 25 will open, energization of the heater 21 will be terminated until such time as sufficient hot water is withdrawn to cause the auxiliary switch 25 to be responsive to cold water and to be moved to closed position.

This condition, which may be called the primary condition, may be continued throughout the entire day and even throughout the entire on-peak period so that the user of a system of the kind herein disclosed will have available at least a predetermined fractional part of the water content of the tank in hot or in a heated condition.

Most central stations provide for an off-peak period, usually extending during the greater part of the night, and for illustrative purposes we may consider an off-peak period to start at 10:00 p. m. and to extend for eight hours thereafter, or until 6:00 a. m. I do not desire to be limited to this length of off-peak period nor to the particular starting and ending times since these are subject to individual opinion and adjustment by the engineers or operators of the central station.

In order to effect remotely controlled energization of the coil 35 I provide, in the central station 55, a source 65 of a suitable high frequency current which, for illustrative purposes, may be considered to have a frequency of 3000 cycles per second. This generator may be of any suitable or desired kind to provide the desired high frequency alternating current and its circuit may include an adjustable condenser 67 and an adjustable reactor coil 69 in order that proper tuning may be effected between the remotely positioned control station and the coil 35 on the customer's premises. I provide a control switch 71 in the central station which for convenience is indicated as being manually actuable. The switch 71 permits of connecting the high frequency current to the conductors 61 and 63 and therefore to the supply circuit conductors 41 and 43 as by conductors 73 and 75 between terminals of the switch 71 and the conductors 61 and 63. The terminals of coil 35 are connected by suitable conductors to the supply circuit conductors 41 and 43.

The switch 71 will be maintained in open position during all of the on-peak period but when the operator desires to effect energization of heater 21 through another circuit including the main thermal heater control switch 23, it is only necessary that the switch 71 be closed to thereby energize the coil 35 by the high frequency current, which energization will result in causing contact arm 31 to move into engagement with contact member 33 whereby the following heater-energizing circuit is closed: From conductor 41 through conductor 45 to the contact arm 31, to contact 33, through conductor 53 to and through the main thermal switch 23 and from there through the heater 21 and conductor 51 to the other supply circuit conductor 43. As long as switch 71 is closed this second heater control circuit will be effective and this heater circuit is controlled electrically by the remotely located control switch 71 and thermally by the main thermal heater control switch 23. As was hereinbefore stated, this main thermal heater control switch 23 is effective to disengage its contacts when substantially all of the water in the tank is hot and it is, therefore, evident that should all of the water in the tank be hot before the end of an off-peak period, deenergization of the heater will be effected as soon as that condition is present.

The operator in the station 55 may open the switch 71 at any desired time, say at 6:00 a. m., whereby the contact arm 31 is permitted to again move into engagement with contact arm 27 or contact member 29 whereupon the primary heater control circuit including the auxiliary thermal switch 25 will tend to maintain in a heated condition a predetermined fractional part of the water content of the tank during a predetermined part (the on-peak part) of a twenty-four hour day.

While I have illustrated and described a specific embodiment of a remotely located and remotely energizable control means for the two-operative-position switch, it is obvious that I may use any other suitable control means which, for instance, may include a separate set of circuit conductors controllable by any suitable means, which means is located in the central station.

Referring now to Fig. 2 of the drawing, I have there illustrated a somewhat modified form of system embodying my invention which permits of deenergizing the heater control system entirely should it be considered desirable, by the engineers in the central station, to do so. Thus it might happen that for reasons unexpected and beyond control, a heavy load is applied to the central station and it is desired to effect disconnection of all of the water heater systems normally connected to the supply or distribution circuits.

For this purpose I provide a second switch shown generally, in Fig. 2 of the drawing, as including a fixed contact member 77 and a contact arm 79 which may be normally biased into engagement with contact member 77 by a spring 81, or by any other suitable means. Contact member 77 is connected by a conductor 83 with contact arm 31 of the two-operative-position switch described hereinbefore.

In order to cause movement of switch or contact arms 79 out of engagement with contact 77, I provide a relay coil 85 having a core member 87 fixed therein which core member is adapted when magnetized by energization of the coil 85, to magnetize an armature 89 on contact arm 79 and cause the arm 79 to be moved out of engagement with contact member 77. Contact arm 79 is connected by a conductor 91 to supply circuit conductor 41.

The central station 55 includes, in this case, not only the alternating current generator 57 of standard frequency and a first high frequency generator 65, but also a higher frequency generator 93, both of which may be driven by any suitable or desired means. The first high frequency generator 65 is controlled as to its supply of energy to the system by the switch 71 while a switch 95 is adapted to control the second or higher frequency generator above described. It is to be understood that both terminals of the high frequency generators are suitably connected to the conductors 61 and 63.

In Fig. 2 of the drawing I have shown an adjustable condenser 97 and an adjustable reactor 99 as associated with the two-operative-position switch and have shown an adjustable condenser 101 and an adjustable reactor 103 as associated with the single-operative-position switch which is effective to interrupt the energization of the water heating system shown in this and in the other figure of the drawing.

The operator at the central station may move the switch 71 for the high frequency generator as was described above in connection with Fig. 1 of the drawing to cause the heater 21 to be energized during the day whenever required to maintain in a heated condition a predetermined fractional part of the water content of the tank to counteract or take care of the withdrawals of hot water therefrom during the greater part of the day. When switch 71 is closed energization of coil 35 will occur and cause movement of contact arm 31 whereby the main thermal switch 23 will be put into the heater energizing circuit with the result that the system will then tend to maintain in a heated condition substantially all of the water content of the tank and this may be done during the off-peak period of a twenty-four hour day.

Should an extreme overload occur on the central station, the operator will close switch 95 of the higher frequency generator which is effective to energize coil 85 of the single-operative-position switch which will result in interrupting the flow of current, if present at that time, through the heater 21.

It is to be noted that my system includes a relatively small number of control elements, particularly switches, and that these switches may be controlled as to the energization of the heater 21 by remotely located means of a very simple kind to obtain the desired result. It may be noted that no additional control circuits between the control station and the respective customers' installations are required, the usual already installed power lines being sufficient. My system provides at least a certain amount of hot water in the tank, less than the total amount in the tank, during say the daylight hours and the early evening hours of a twenty-four hour period and then to maintain substantially all of the water in the tank in a heated condition so that the early morning or forenoon hours of the day will find the tank full of hot water or practically full of hot water.

Various other modifications may be made in the system embodying my invention without departing from the spirit and scope thereof and all other modifications clearly coming within the scope of the appended claims are to be considered as being covered thereby.

I claim as my invention:

1. An electric water heating system for a hot water tank having a single electric heater at the lower end of the tank, comprising a main and an auxiliary thermal heater control switch responsive to tank water temperature at different heights of the tank, a two-operative-oposition heater control switch normally yieldingly biased into a first position to cause energization of the heater through said auxiliary thermal switch in case less than a predetermined fractional part of the water content of the tank is hot, and manually-actuable remotely controlled electromagnetic means to cause said two-operative-position switch to move into and be held in its second position to cause energization of the heater through said main thermal switch only in case less than substantially all of the water in the tank is hot.

2. A water heating system for a hot water tank having a single electric heater adjacent to the lower end of the tank, comprising a pair of thermal heater control switches at different heights of the tank, a two-operative position heater control switch normally yieldingly biased into one of its operative positions to cause energization of the heater through the upper of said thermal switches in case said upper thermal switch is subject to cold water, electromagnetic means for causing said two-operative position heater control switch to move into its other operative position to cause energization of the heater through the lower of said thermal switches in case said lower thermal switch is subject to cold water, a heater control switch in series circuit with said two-operative position switch normally yieldingly biased into circuit closing position, and electromagnetic means to cause opening movement of said last named heater control switch to deenergize the heating system.

3. A water heating system for a hot water tank having a single electric heater adjacent to the lower end of the tank, comprising a pair of thermal heater control switches at different heights of the tank, a two-operative position heater control switch normally yieldingly biased into one of its operative positions to cause energization of the heater through the upper of said thermal switches in case said upper thermal switch is subject to cold water, electromagnetic means for causing said two-operative position heater control switch to move into its other operative position to cause energization of the heater through the lower of said thermal switches in case said lower thermal switch is subject to cold water, a heater control switch in series circuit with said two-operative position switch normally yieldingly biased into circuit closing position, electromagnetic means to cause opening movement of said last named heater control switch to deenergize the heating system and remotely located means for selectively energizing said plurality of electromagnetic means at the will of an operator.

CLARK M. OSTERHELD.